US 8,973,948 B2

(12) United States Patent
Kanai

(10) Patent No.: US 8,973,948 B2
(45) Date of Patent: Mar. 10, 2015

(54) FUEL TANK FOR SADDLE-RIDE TYPE VEHICLE

(75) Inventor: Yuki Kanai, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 68 days.

(21) Appl. No.: 13/456,733

(22) Filed: Apr. 26, 2012

(65) Prior Publication Data

US 2012/0274057 A1 Nov. 1, 2012

(30) Foreign Application Priority Data

Apr. 28, 2011 (JP) ................. 2011-100812

(51) Int. Cl.
*B60K 15/07* (2006.01)
*B62J 35/00* (2006.01)

(52) U.S. Cl.
CPC ..................................... *B62J 35/00* (2013.01)
USPC ............................ 280/835; 180/219; 224/413

(58) Field of Classification Search
CPC ....................................................... B62J 35/00
USPC ................. 280/833, 834, 835, 830; 296/78.1;
220/562, 563, 564, 4.14; 180/68.1,
180/219, 229
See application file for complete search history.

(56) References Cited

U.S. PATENT DOCUMENTS

| | | | | |
|---|---|---|---|---|
| 2,217,251 A | * | 10/1940 | Heaslet ......................... | 180/291 |
| 2,417,337 A | * | 3/1947 | Whitesell, Jr. ................ | 220/563 |
| 4,487,283 A | * | 12/1984 | Suzuki et al. ................. | 180/219 |
| 4,830,135 A | * | 5/1989 | Yamashita .................... | 180/229 |
| 5,692,578 A | * | 12/1997 | Miyakawa et al. ........... | 180/68.3 |
| 6,341,792 B1 | * | 1/2002 | Okuma ....................... | 280/304.3 |
| 7,252,170 B2 | * | 8/2007 | Miyakozawa et al. ........ | 180/219 |
| 7,475,749 B2 | * | 1/2009 | Yoshida et al. .............. | 180/68.1 |
| 7,690,689 B2 | * | 4/2010 | Muroo et al. ................. | 280/833 |
| 7,712,786 B2 | * | 5/2010 | Koike ........................... | 280/835 |
| 7,717,466 B2 | * | 5/2010 | Asamura et al. ............. | 280/835 |
| 2005/0110265 A1 | | 5/2005 | Miyakozawa et al. | |
| 2006/0175112 A1 | * | 8/2006 | Yoshida et al. ............... | 180/229 |
| 2009/0166364 A1 | * | 7/2009 | Shimomura ................... | 220/562 |

FOREIGN PATENT DOCUMENTS

| | | | |
|---|---|---|---|
| DE | 2641397 A1 | * | 3/1978 |
| JP | 05008780 A | * | 1/1993 |
| JP | 07242188 A | * | 9/1995 |
| JP | 2009-214621 | | 9/2009 |

* cited by examiner

*Primary Examiner* — Joseph Rocca
*Assistant Examiner* — Jacob Knutson
(74) *Attorney, Agent, or Firm* — Rankin, Hill & Clark LLP

(57) ABSTRACT

A fuel tank for a saddle-ride type vehicle includes a lower half body and an upper half body. The lower half body has a left lower flange part and a right lower flange part, the upper half body has a left upper flange part and a right upper flange part, and the fuel tank is constituted by welding the left lower flange part and the left upper flange part and welding the right lower flange part and the right upper flange part. Left and right fold parts and as folded downward are provided on the left and right upper flange parts.

14 Claims, 9 Drawing Sheets

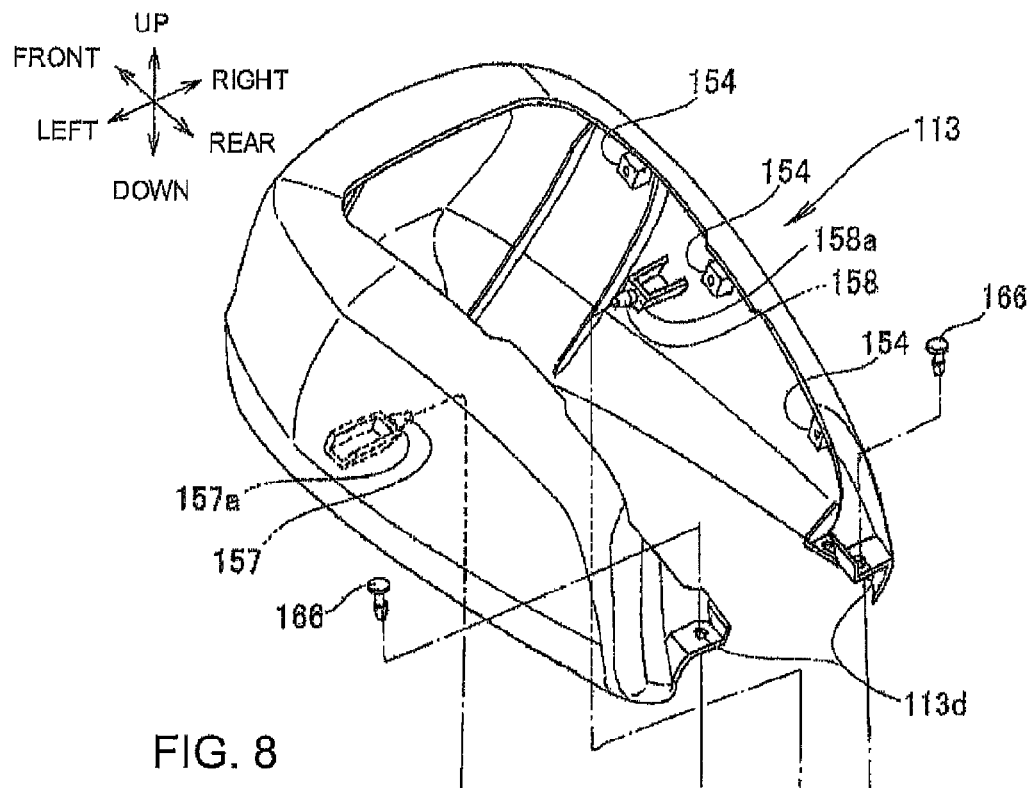
FIG. 8
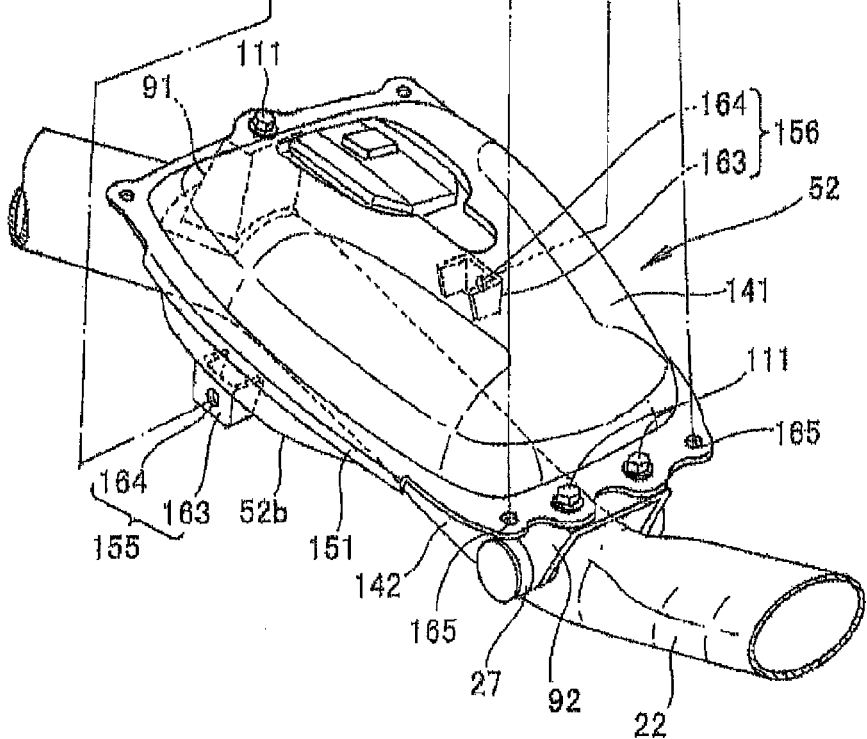

FUEL TANK FOR SADDLE-RIDE TYPE VEHICLE

BACKGROUND OF THE INVENTION

1. Field of the Invention

This invention relates to saddle-ride type vehicles and, more particularly, toward fuel tanks for saddle-ride type vehicles.

2. Description of Related Art

There is known a technique for preventing a fluid, such as fuel or rainwater, from dropping along the sidewall of a fuel tank from adhering to other vehicle components (for example, see JP-A No. 2009-214621 (FIGS. 1 and 4)).

As shown in FIG. 1 of JP-A No. 2009-214621, in a front portion of a motorcycle (10) (hereinafter, the numerals in parentheses denote the reference signs used in JP-A No. 2009-214621), a fuel tank (50) is provided and a shroud (60) as a vehicle body cover that partially covers the fuel tank (50) is provided on the outer side of the fuel tank (50) in the transverse direction of the vehicle.

As shown in FIG. 4 of JP-A No. 2009-214621, a guide member (100) is attached to a tank flange (52) of the fuel tank (50). This guide member (100) includes a clamping part (110) attached in a way to clamp the edge of the tank flange (52) and a fluid guide part (150) extending from the clamping part (110) to receive a fluid flowing down along the fuel tank (50).

In the technique in JP-A No. 2009-214621, the tank flange (52) is protected by the guide member (100). In other words, the guide member (100) is needed to protect the tank flange (52).

As there is demand for vehicle cost reduction, a technique for protecting the tank flange without an increase in the number of components is needed in the art.

SUMMARY OF THE INVENTION

The present invention is directed toward a technique that protects a tank flange without an increase in the number of components in a fuel tank for a saddle-ride type vehicle.

In accordance with the present invention, a fuel tank that is mounted on a saddle-ride type vehicle is constituted by butt joining a lower half body and an upper half body. The lower half body is open on an upper side and has a left lower flange part and a right lower flange part that are located left and right in a transverse direction of the vehicle, extending in a longitudinal direction of the vehicle. The upper half body is open on a lower side and has a left upper flange part and a right upper flange part that are located left and right in the transverse direction of the vehicle, extending in the longitudinal direction of the vehicle. The fuel tank is constituted by welding the left lower flange part and the left upper flange part and welding the right lower flange part and the right upper flange part. Left and right fold parts, as folded upward or downward, are provided on either the left and right lower flange parts or the left and right upper flange parts.

Since the left and right fold parts as folded upward or downward cover the flange parts, which are located left and right in the transverse direction of the vehicle and extend in the longitudinal direction of the vehicle, the flange parts can be protected without an increase in the number of components.

In further accordance with the present invention, the left and right fold parts as folded downward are located on the left upper flange part and the right upper flange part.

In accordance with another aspect of the invention, the left and right fold parts as folded upward are located on the left lower flange part and the right lower flange part. Therefore, the fold parts can be formed more easily than by folding downward the left upper and lower flange parts and the right upper and lower flange parts. Therefore, the fold parts can be formed more easily than by folding upward the left upper and lower flange parts and the right upper and lower flange parts.

In further accordance with the present invention, the fuel tank includes a tank cover for covering at least part of the fuel tank. Abutting surfaces, which abut on the left and right fold parts when the tank cover is deformed, are provided on an inner surface of the tank cover. When the tank cover is deformed inward in the transverse direction of the vehicle due to the occupant's knee grip or the like, the abutting surfaces of the tank cover are received by the fold parts of the fuel tank. When the fold parts are provided on the fuel tank to enable the forces applied to the abutting surfaces of the tank cover to be received on surfaces so that the inward forces of the tank cover in the transverse direction of the vehicle are received on the surfaces of the fold parts, an excessive force is less likely to be applied to the tank cover than when the abutting surfaces of the tank cover are received on points or lines of the fold parts and also the possibility of deformation of the tank cover is reduced.

In accordance with another aspect of the invention, the cover fittings to which the tank cover is attached extend downward from a bottom of the fuel tank and cover engaging parts that are engaged with the cover fittings are provided nearly at a center in a height direction of the tank cover. In other words, even when the nearly central point of the tank cover in its height direction is below the bottom of the fuel tank and the tank cover extends downward from the fuel tank, and even when a force is applied to the tank cover from outside in the transverse direction of the vehicle, the tank cover can be held in position securely while keeping the positional relation between the fuel tank and the tank cover.

BRIEF DESCRIPTION OF THE DRAWINGS

FIG. 8 is an exploded perspective view of the fuel tank and its surroundings.

DETAILED DESCRIPTION OF THE PREFERRED EMBODIMENTS

Figure 1:
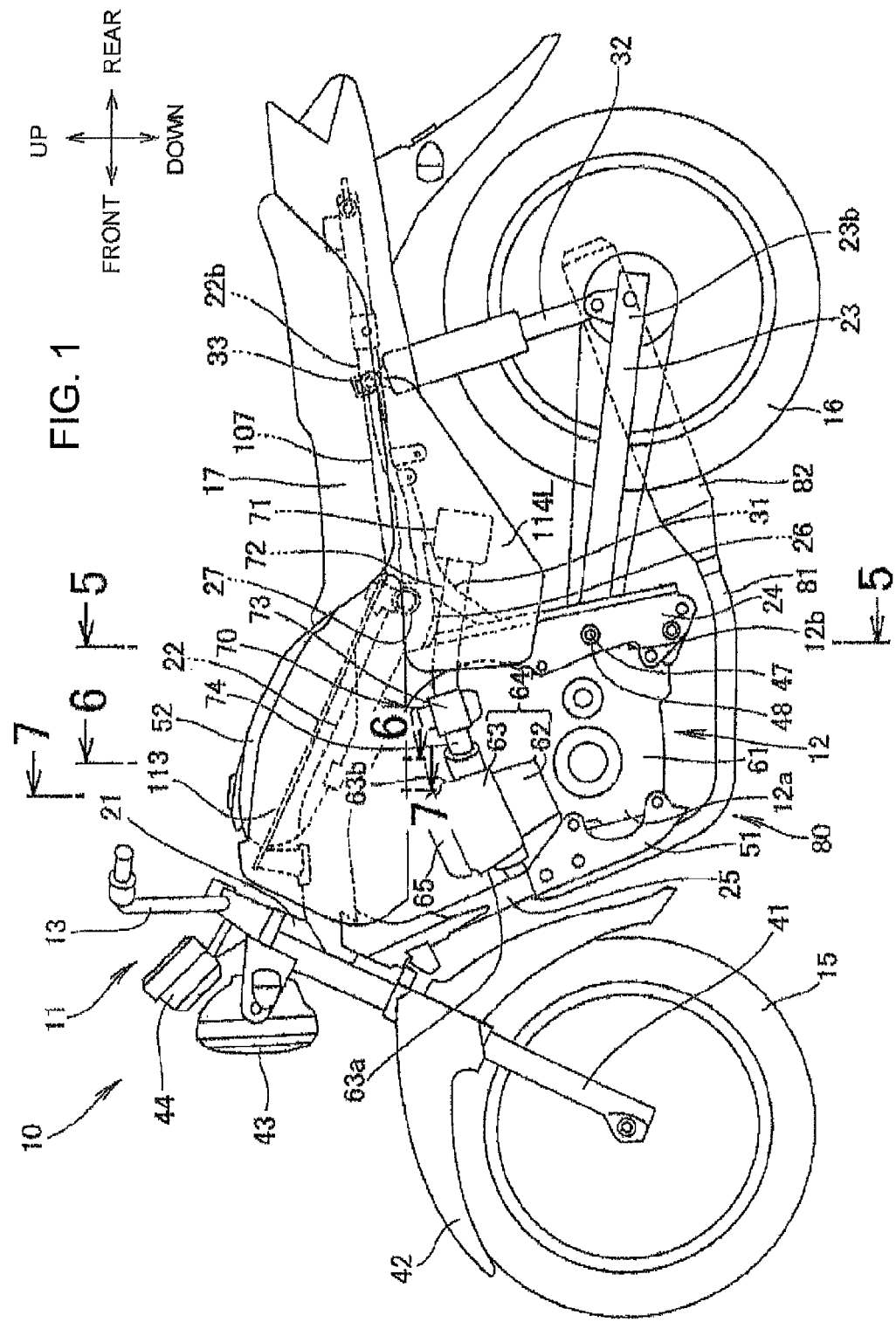
FIG. 1 is a left side view of a motorcycle according to the prevent invention.

Next, embodiments of the present invention will be described in detail. In the drawings and embodiments, words such as "top", "bottom", "front", "rear", "left", and "right" refer to directions as seen from the rider of the motorcycle. The drawings should be seen according to the orientations of reference signs.

First, the first embodiment of the present invention will be described referring to drawings.

As shown in FIG. 1, a motorcycle 10 is a saddle-ride type vehicle which includes a frame 11 constituting a vehicle skeleton, an engine 12 as a drive source suspended on the frame 11, a front wheel 15 which is located at the front end of the frame 11 and can be steered by a handlebar 13, a rear wheel 16 which is located at the rear of the frame 11 and driven by the engine 12, and a seat 17 located between the front wheel 15 and rear wheel 16, in which an occupant straddles and sits on the seat 17.

Next, the structure of the frame will be described.

Figure 2:
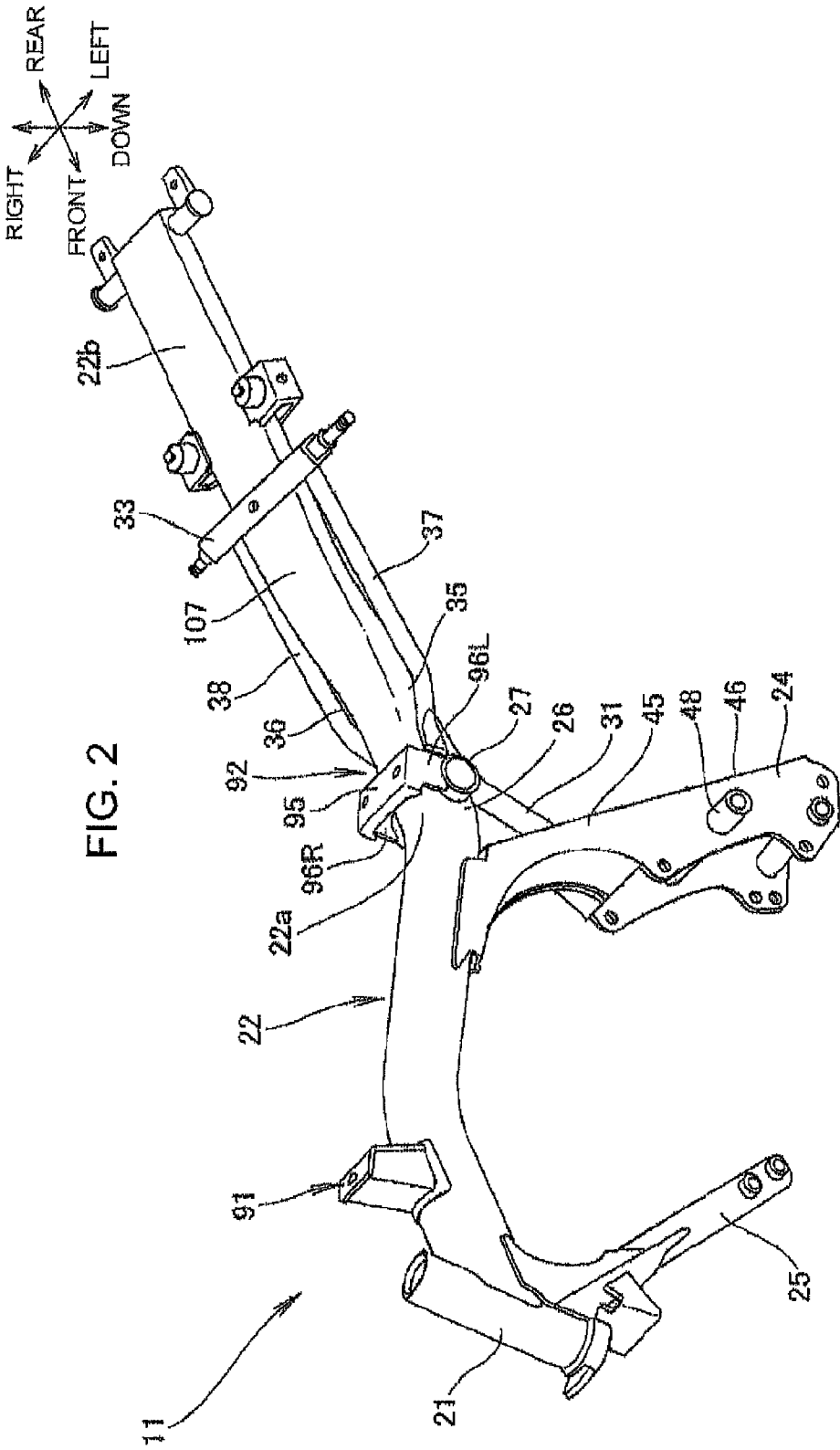
FIG. 2 is a perspective view of a frame of the motorcycle.

As shown in FIG. 2, the frame 11 includes: a head pipe 21; a hollow main frame 22 extending from the head pipe 21 in the longitudinal direction of the vehicle; a pivot frame 24 extending downward from the middle of the main frame 22 and supporting a swing arm 23 swingably; a down frame 25 extending from the bottom of the head pipe 21 in the obliquely downward and backward direction of the vehicle and supporting the front of the engine 12; a cross pipe 27 lying across a bend portion 26 as bent in the middle 22a of the main frame 22 in the transverse direction of the vehicle; a sub frame 31 located behind the cross pipe 27, lying between the main frame 22 and the pivot frame 24; a cushion frame 33 located behind the cross pipe 27, extending in the transverse direction of the vehicle and being fixed on the upper surface of the main frame 22, with the upper end of a rear cushion (reference sign 32 in FIG. 1) attached thereto; and left and right reinforcing frames 37 and 38 located behind the cross pipe 27, extending from left and right walls 35 and 36 of the bend portion along the main frame 22 in the rearward direction of the vehicle respectively, with their rear ends joined to the cushion frame 33.

The bend portion 26 of the main frame 22 is located behind the point where the pivot frame 24 branches off the main frame 22.

The pivot frame 24 extending downward from the main frame 22 is a folded plate member and its upper half 45 has a rectangular cross section and its lower half 46 has a U-shaped cross section which is open toward the front of the vehicle. A tubular part 48 through which a pivot shaft (reference sign 47 in FIG. 1) is passed lies in the lower half 46 in the transverse direction of the vehicle.

Referring back to FIG. 1, the main frame 22 has a V shape in a side view of the vehicle, in which it is bent at the bend portion 26. The swing arm 23 is swingably supported by the tubular part 48 in the pivot frame 24.

Next, members which are attached to the frame 11 will be described.

A front fork 41 for supporting the front wheel 15 is steerably provided on the head pipe 21 and a handlebar 13 which is integral with the front fork 41 and steered by the occupant is located above the head pipe 21. A front fender 42, a headlight 43, and a meter 44 are attached on the front fork 41.

An engine hanger 51 is located below the down frame 25 and the front 12a of the engine is attached to the engine hanger 51. The rear 12b of the engine is attached to the pivot frame 24. A fuel tank 52 is attached to the main frame 22 above the engine 12 and a seat 17, extending toward the rear of the vehicle continuously with the rear end of the fuel tank 52, is attached to the main frame 22. The main frame 22 is a so-called mono-backbone frame which includes a seat rail 107 for supporting the seat 17.

The engine 12 includes: a crankcase 61 housing a transmission; a cylinder section 64 comprised of a cylinder block 62 and a cylinder head 63 that extend upward from the crankcase 61; a head cover 65 for covering the cylinder head 63 of the cylinder section 64; an air intake system 70 connected to the rear wall 63b of the cylinder head 63; and an exhaust system 80 connected to the front wall 63a of the cylinder head, extending from the front of the vehicle toward the rear thereof.

The exhaust system 80 includes an exhaust pipe 81 extending from the cylinder head 63, first forward, then downward, and then rearward of the vehicle and a muffler 82 connected to the rear end of the exhaust pipe 81, extending toward the rear of, the vehicle.

The air intake system 70 includes: an air cleaner 71 located below the seat 17; a connecting tube 72 extending from the air cleaner 71 toward the front of the vehicle; a throttle body 73 connected to the tip of the connecting tube 72; and an intake pipe 74 extending from the throttle body 73 toward the front of the vehicle and being connected to the rear wall 63b of the cylinder head.

A pivot shaft 47 extends in the lower portion of the pivot frame 24 left and right in the transverse direction of the vehicle. The swing arm 23 extends from the pivot shaft 47 toward the rear of the vehicle. The rear wheel 16, which is driven by the engine 12, is attached to the rear end 23b of the swing arm 23. The existence of the rear cushion 32 between the rear end 23b of the swing arm 23 and the rear 22b of the main frame permits the rear wheel 16 to be swingably supported by the frame 11.

Figure 3:
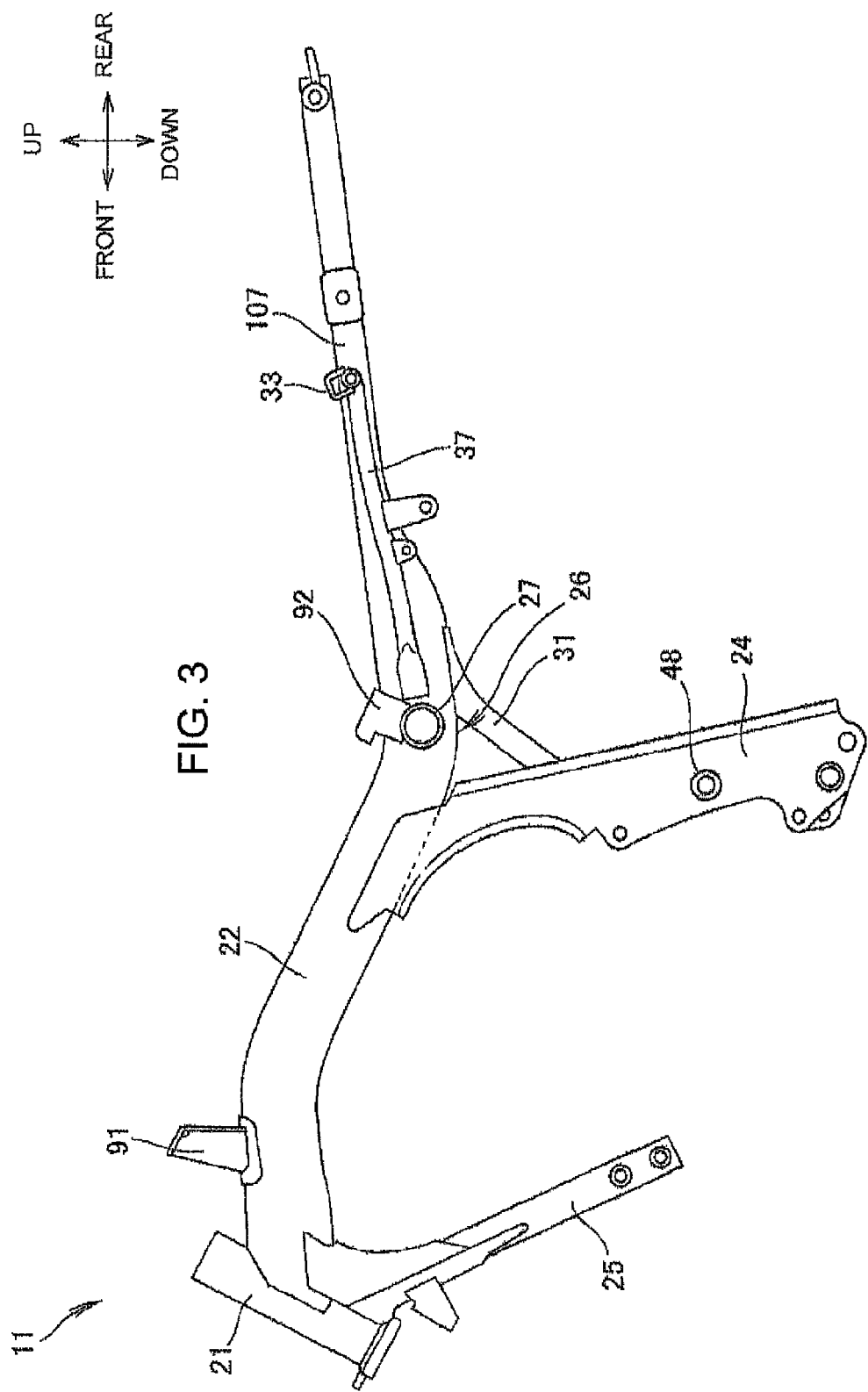
FIG. 3 is a left side view of the frame of the motorcycle.

As shown in FIG. 3, a front tank stay 91 for supporting the front end of the fuel tank (reference sign 52 in FIG. 1) is erected on the upper surface of the front portion of the main frame 22 and a rear tank stay 92 for supporting the rear end of the fuel tank 52 is erected on the cross pipe 27 via mounting arms 96L, 96R.

Next, the fuel tank attachment structure will be described.

Figure 4:
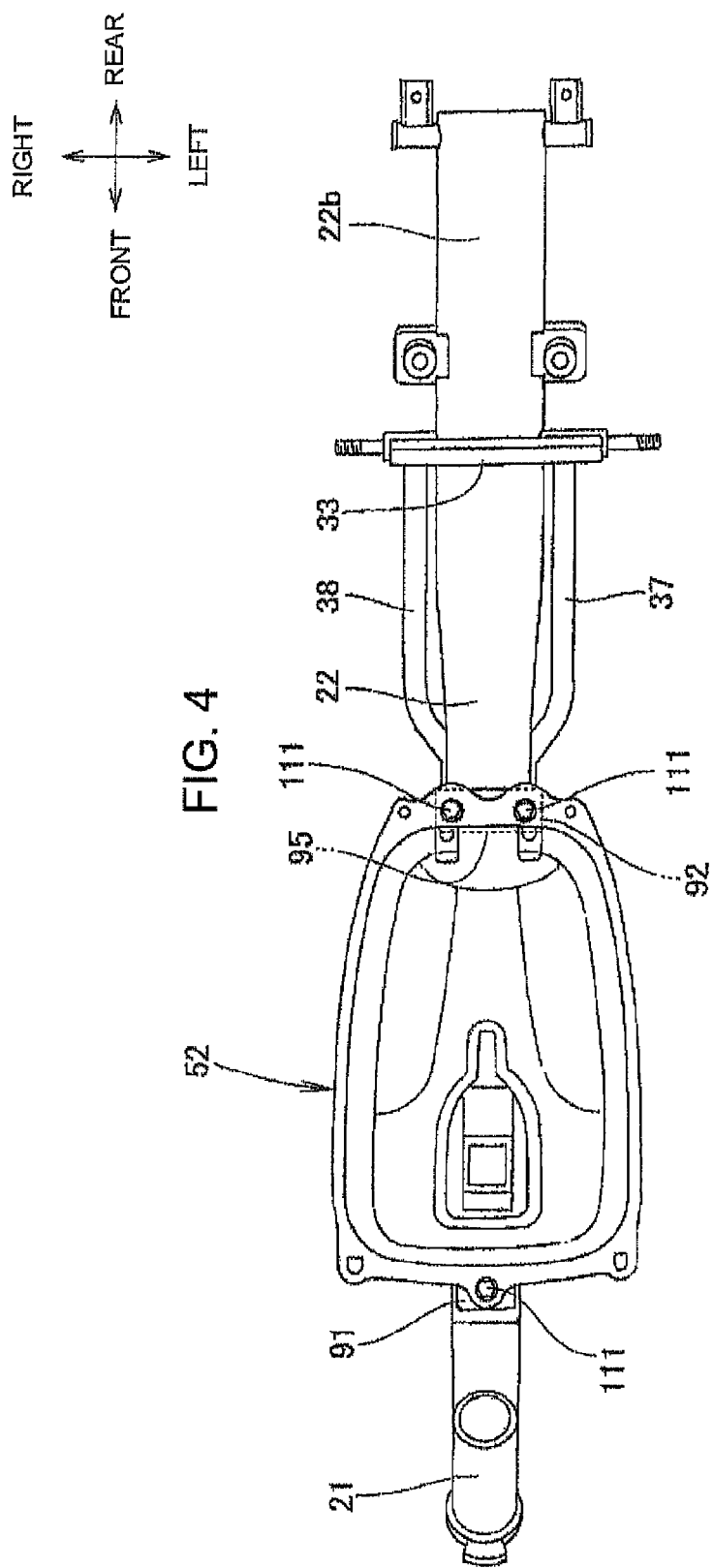
FIG. 4 is a plan view of the frame on which a fuel tank is mounted.

As shown in FIG. 4, the front of the fuel tank 52 is fastened with a fastening bolt 111 in the transversal center of the front tank stay 91 and the rear of the fuel tank 52 is fastened with fastening bolts 111 in the tank receiving part 95 constituting the rear tank stay 92.

Referring back to FIG. 1, a tank cover for covering the fuel tank and a vehicle body cover will be described.

For the fuel tank 52, a tank cover 113 is located on the lateral sides of the fuel tank 52. The fuel tank 52 is covered by the tank cover 113. Behind the tank cover 113, side covers 114L and 114R (only reference sign 114L on the near side is shown in the figure) are located behind and continuously with the tank cover 113. The side covers 114L and 114R cover the lateral sides of the middle portion of the vehicle.

Next, the fuel tank structure including the fuel tank and the tank cover for covering the fuel tank will be described referring to FIGS. 5 to 7.

Figure 5:
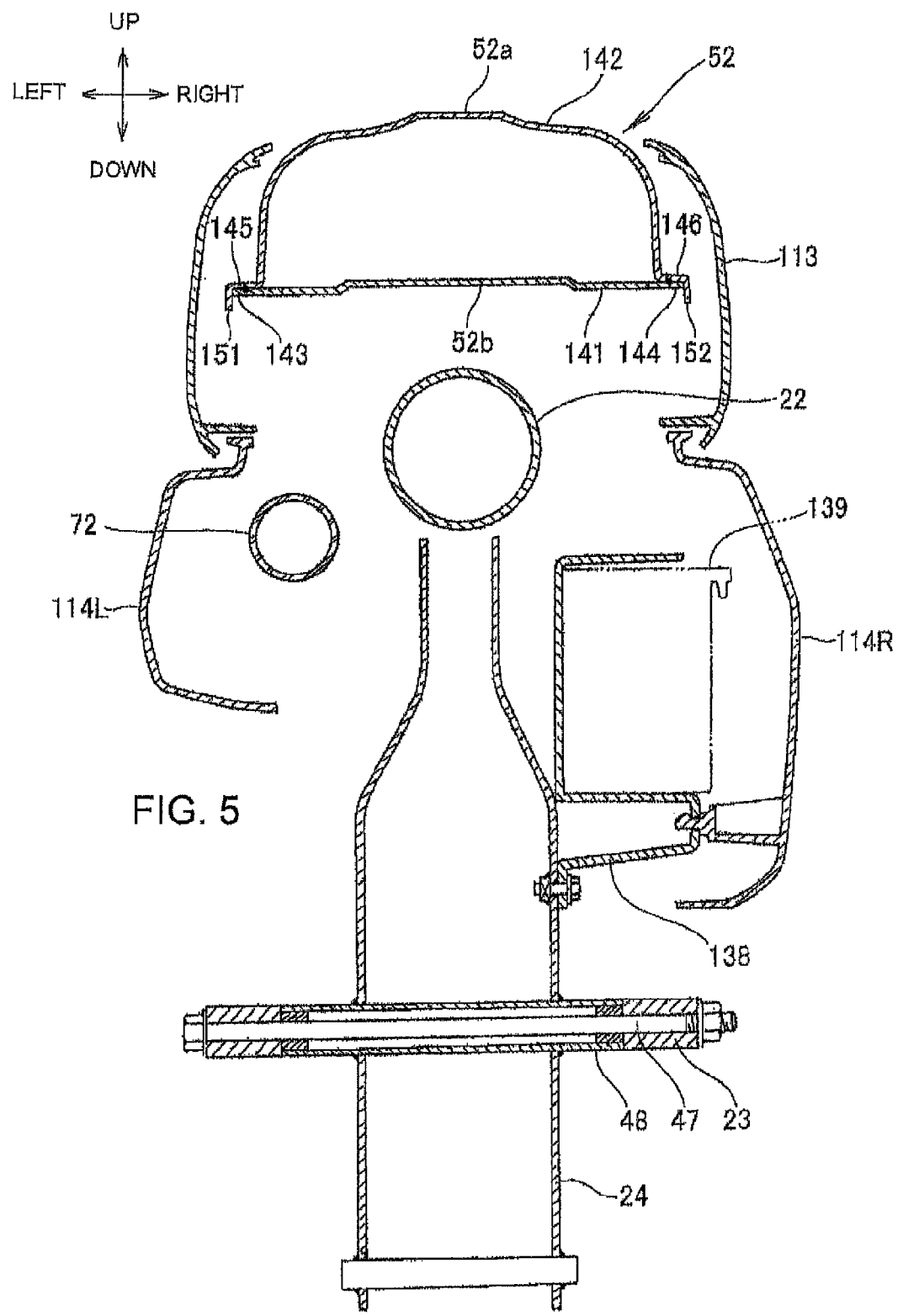
FIG. 5 is a sectional view taken along the line 5-5 of FIG. 1.

As shown in FIG. 5, the fuel tank structure includes the motorcycle fuel tank 52 (hereinafter also called the "fuel tank 52") and the tank cover 113 for covering the left and right lateral sides of the fuel tank 52 in the transverse direction of the vehicle.

The lower half body 141 of the fuel tank has a left lower flange part 143 and a right lower flange part 144 that extend in the longitudinal direction of the vehicle left and right in the transverse direction of the vehicle and are joined to the upper half body 142 of the fuel tank.

The upper half body 142 of the fuel tank has a left upper flange part 145 and a right upper flange part 146 that extend in the longitudinal direction of the vehicle left and right in the transverse direction of the vehicle and are joined to the lower half body 141 of the fuel tank.

The left lower flange part 143 and left upper flange part 145 are welded together and the right lower flange part 144 and right upper flange part 146 are welded together to make up the fuel tank 52.

Left and right fold parts 151 and 152, which are folded downward, are folded parts of the left upper flange part 145 and right upper flange part 146.

The left and right fold parts 151 and 152 are formed just by folding downward the left upper flange part 145 and right upper flange part 146. Therefore, the fold parts 151 and 152 which protect the flange parts can be formed more easily than by folding downward the left upper and lower flange parts 145 and 143 and the right upper and lower flange parts 146 and 144 at a time.

In addition, a battery tray 138 for housing a battery 139 is attached to the pivot frame 24 and a right side cover 114R is detachably attached to the battery tray 138 on the right side in the transverse direction of the vehicle.

Figure 6:
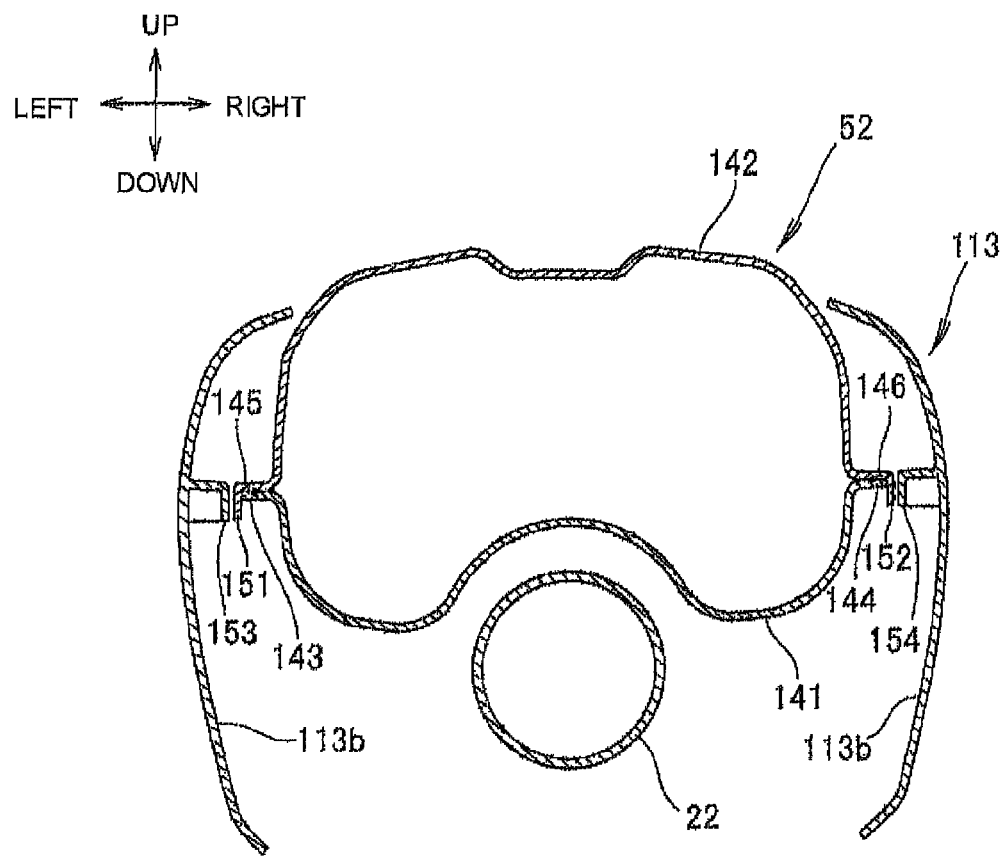
FIG. 6 is a sectional view taken along the line 6-6 of FIG. 1.

As shown in FIG. 6, the fuel tank 52 is constituted by butt joining the lower half body 141 with an open top and the upper half body 142 with an open bottom. Left and right abutting surfaces 153 and 154, which abut on the left and right fold parts 151 and 152 when the tank cover 113 is deformed, are provided on inner surfaces 113b of the tank cover 113 which are oriented inward in the transverse direction of the vehicle.

The left and right fold parts 151 and 152 and the left and right abutting surfaces 153 and 154 are all oriented the same way along the height direction so that inward displacement of the tank cover 113 which occurs in the transverse direction of the vehicle due to the occupant's knee grip or the like is securely received by the left and right fold parts 151 and 152 of the fuel tank 52 as the left and right abutting surfaces 153 and 154 are displaced inward of the vehicle and these left and right abutting surfaces 153 and 154 abut on the left and right fold parts 151 and 152 of the fuel tank 52.

Figure 7:
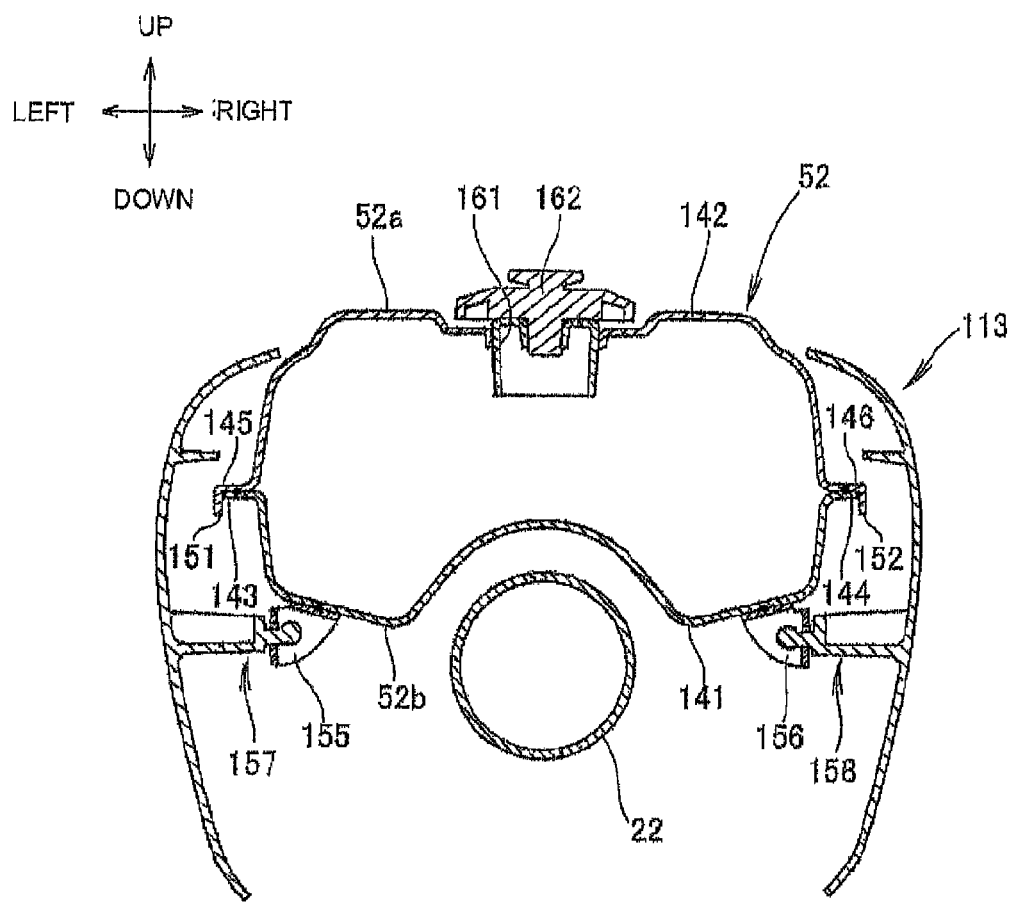
FIG. 7 is a sectional view taken along the line 7-7 of FIG. 1.

As shown in FIG. 7, cover fittings 155 and 156, to which the tank cover 113 is attached, extend downward from the bottom 52b of the fuel tank and cover engaging parts 157 and 158 which are engaged with the cover fittings 155 and 156 are provided in a way to protrude inward in the transverse direction of the vehicle nearly at the center in the height direction of the tank cover 113.

When the cover engaging parts 157 and 158 are located nearly at the center in the height direction of the tank cover 113, a force that the tank cover 113 receives from outside in the transverse direction of the vehicle can be received more stably than when the cover engaging parts 157 and 158 are located in an upper or lower place in the height direction of the tank cover 113.

An oil filler port 161 is opened in the upper surface 52a of the fuel tank and an oil filler cap 162 is provided on the oil filler port 161 in an openable and closable manner.

As shown in FIG. 8, the fuel tank 52 assembled by joining the upper half body 142 and lower half body 141 is fastened onto the front tank stay 91 and rear tank stay 92 erected on the front and rear portions of the main frame 22 with three fastening bolts 111.

The stay-like left and right cover fittings 155 and 156 each having an engaging surface 163 extending along the height direction and an engaging hole 164 opened in the engaging surface 163 are provided on the bottom 52b of the fuel tank and the cover engaging parts 157 and 158 are engaged with the engaging holes 164 of the left and right cover fittings 155 and 156 from outside in the transverse direction of the vehicle to place the tank cover 113 over the tank. The left and right engaging surfaces 163 and surfaces 157a and 158a formed on the cover engaging parts 157 and 158 which abut on the left and right engaging surfaces 163 respectively are all oriented the same way in the height direction.

The rear ends 113d of the tank cover are fastened with pin members 166 in cover fastening holes 165 opened in the flange parts 145 and 146 of the fuel tank 52.

The tank cover 113 is a resin member in which the front is closed and the top, rear and bottom are open and on its left and right inner surfaces it has a plurality of abutting surfaces 153 and 154 (only reference sign 154 on the far side is shown in the figure) which abut on the left and right fold parts 151 and 152 (only reference sign 151 on the near side is shown in the figure) formed by folding downward the left and right upper flange parts 145 and 146 partially when the tank cover is pressed inward in the transverse direction of the vehicle.

Next, how the abovementioned fuel tank for a motorcycle functions will be described.

Referring back to FIG. 6, as far as the left and right lower flange parts 143 and 144 or the left and right upper flange parts 145 and 146 are concerned, the left and right fold parts 151 and 152 as folded downward are provided on the left and right upper flange parts 145 and 146.

Since the left and right fold parts 151 and 152 as folded downward cover the left and right lower flange parts 143 and 144 which are located left and right in the transverse direction of the vehicle and extend in the longitudinal direction of the vehicle, the flange parts can be protected without an increase in the number of components.

Alternatively, it is also acceptable that left and right fold parts as folded upward, provided on the left and right lower flange parts 143 and 144, cover the left and right upper flange parts 145 and 146 which are located left and right in the transverse direction of the vehicle and extend in the longitudinal direction of the vehicle. There is no problem with the provision of such left and right fold parts.

The abutting surfaces 153 and 154, which abut on the left and right fold parts 151 and 152, are provided on the inner surfaces 113b of the tank cover.

When the tank cover 113 is deformed inward in the transverse direction of the vehicle due to the occupant's knee grip or the like, the abutting surfaces 153 and 154 of the tank cover are received by the fold parts 151 and 152. When the fold parts 151 and 152 are provided to enable the forces applied to the abutting surfaces 153 and 154 of the tank cover to be received on surfaces so that the inward forces of the tank cover 113 in the transverse direction of the vehicle are received on the surfaces of the fold parts 151 and 152, an excessive force is less likely to be applied to the tank cover 113 than when the abutting surfaces 153 and 154 of the tank cover are received on points or lines of the fold parts and also the possibility of deformation of the tank cover 113 is reduced.

Referring back to FIG. 7, the cover fittings 155 and 156, which extend downward from the bottom 52b of the fuel tank and the cover engaging parts 157 and 158 to engage with the cover fittings 155 and 156, are located nearly at the center in the height direction of the tank cover 113.

In other words, even when the nearly central point of the tank cover 113 in its height direction is below the bottom 52b of the fuel tank and the tank cover 113 extends downward beyond the fuel tank 52, and even when a force is applied to the tank cover 113 from outside in the transverse direction of the vehicle, the tank cover 113 can be held in position securely while keeping the positional relation between the fuel tank 52 and the tank cover 113.

Next, the second embodiment of the present invention will be described referring to drawings.

Figure 9:
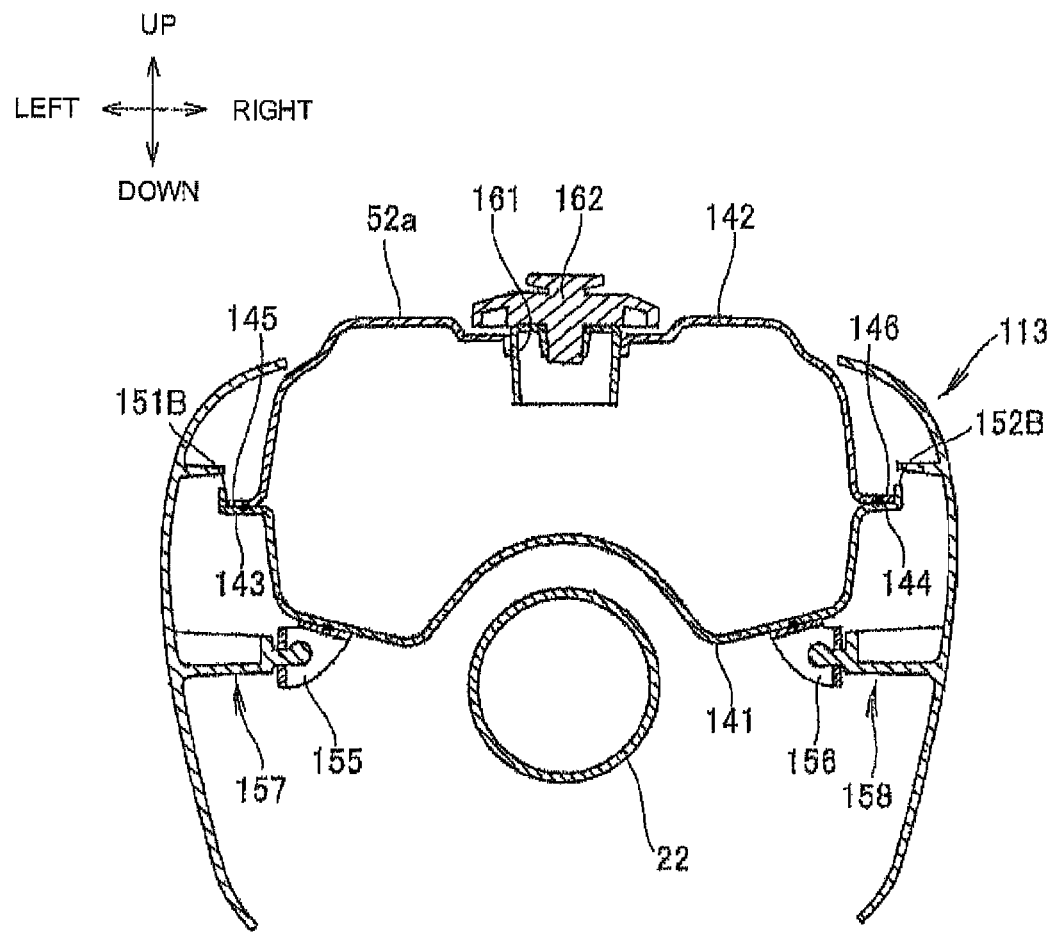
FIG. 9 is a view of another embodiment of what is shown in FIG. 7.

As shown in FIG. 9, left and right fold parts 151B and 152B as folded upward are formed by folding the left lower flange part 143 and right lower flange part 144 partially.

The significant difference from the first embodiment is that the left and right lower flange parts 143 and 144 of the lower half body 141 are partially folded upward to make fold parts 151B and 152B and these fold parts 151B and 152B can receive the left and right abutting surfaces 153 and 154 as shown in FIG. 6. There is no substantial difference in the other aspects.

The fold parts 151B and 152B which protect the flange parts can be formed just by folding the left lower flange part 143 and right lower flange part 144 upward. Therefore, the fold parts 151B and 152B can be formed more easily than by folding the left upper and lower flange parts 145 and 143 and the right upper and lower flange parts 146 and 144 upward.

Although the present invention is applied to motorcycles in the above embodiments, it may be applied to three-wheeled vehicles and there is no problem with its application to ordinary vehicles.

What is claimed is:

1. A fuel tank for a saddle-ride type vehicle which is mounted on the saddle-ride type vehicle and constituted by butt joining a lower half body and an upper half body, wherein:
    the lower half body is open on an upper side and has a left lower flange part and a right lower flange part which are located left and right in a transverse direction of the vehicle, extending in a longitudinal direction of the vehicle;
    the upper half body is open on a lower side and has a left upper flange part and a right upper flange part which are located left and right in the transverse direction of the vehicle, extending in the longitudinal direction of the vehicle;
    the fuel tank is constituted by welding the left lower flange part and the left upper flange part and welding the right lower flange part and the right upper flange part;
    a left fold part that is folded so as to integrally extend away from one of the left upper and lower flange parts and toward the other of said left upper and lower flange parts such that said left fold parts extends adjacent to a free end of the other of said left upper and lower flange parts;
    a right fold part that is folded so as to integrally extend away from one of the right upper and lower flange parts and toward the other of said right upper and lower flange parts such that said right fold part extends adjacent a free end of the other of said right upper and lower flange parts; and,
    a tank cover for covering at least part of the fuel tank, said tank cover having an inner surface including left and right abutting surfaces spaced from the left and right fold parts.

2. The fuel tank according to claim 1, wherein the left and right fold parts as folded downwardly and are integrally provided on the left upper flange part and the right upper flange part.

3. The fuel tank according to claim 2,
    wherein said left and right abutting surfaces are configured to abut on the left and right fold parts, respectively, upon inward deformation of the tank cover.

4. The fuel tank according to claim 3, wherein cover fittings to which the tank cover is attached extend downward from a bottom of the fuel tank at a position generally near a middle of a length of the fuel tank, and cover engaging parts, which are engaged with the cover fittings, are provided nearly at a center in a height direction of the tank cover.

5. The fuel tank according to claim 1, wherein the left and right fold parts as folded upwardly and are integrally provided on the left lower flange part and the right lower flange part.

6. The fuel tank according to claim 5,
    wherein said left and right abutting surfaces are configured to abut the left and right fold parts, respectively, upon inward deformation of the tank cover.

7. The fuel tank according to claim 6, wherein cover fittings to which the tank cover is attached extend downward from a bottom of the fuel tank at a position generally near a middle of the length of the fuel tank, and cover engaging parts, which are engaged with the cover fittings, are provided nearly at a center in a height direction of the tank cover.

8. The fuel tank according to claim 1,
    wherein said left and right abutting surfaces are configured to abut the left and right fold parts, respectively, upon inward deformation of the tank cover.

9. The fuel tank according to claim 8, wherein cover fittings to which the tank cover is attached extend downward from a bottom of the fuel tank at a position generally near a middle of a length of the fuel tank, and cover engaging parts, which are engaged with the cover fittings, are provided nearly at a center in a height direction of the tank cover.

10. The fuel tank according to claim 9, wherein said cover engaging parts are integrally formed with said tank cover.

11. The fuel tank according to claim 9, wherein each of said cover fittings includes an engaging surface and an engaging hole opened in the engaging surface, and said cover engaging parts are engaged with the engaging holes.

12. The fuel tank according to claim 1, wherein said left and right abutting surfaces are integrally formed with said tank cover.

13. The fuel tank according to claim 1, wherein said left and right abutting surfaces include a plurality of left and right abutting surfaces.

14. The fuel tank according to claim 1, wherein said tank cover is solely mounted to said fuel tank.

* * * * *